United States Patent Office 3,037,980
Patented June 5, 1962

3,037,980
PYRROLOPYRIMIDINE VASODILATORS AND METHOD OF MAKING THEM
George H. Hitchings, Yonkers, Kurt W. Ledig, New Rochelle, and Robert A. West, White Plains, N.Y., assignors to Burroughs Wellcome & Co. (U.S.A.) Inc., Tuckahoe, N.Y., a corporation of New York
No Drawing. Filed Mar. 4, 1960, Ser. No. 12,675
Claims priority, application Great Britain Aug. 18, 1955
11 Claims. (Cl. 260—256.4)

The present application relates to a new group of pyrrolo(2,3-d)pyrimidines bearing amino groups in the 4-position of the pyrrolo(2,3-d)pyrimidine ring system and is a continuation in part of our U.S. applications Serial No. 602,912, filed August 8, 1956 and 721,104, filed March 13, 1958. The new derivatives may be represented by the following formula:

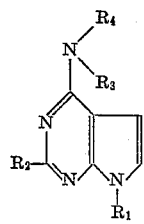

wherein $R_1$ and $R_2$ are selected from the class consisting of hydrogen and lower alkyl groups, $R_3$ is selected from the class consisting of hydrogen and lower alkyl groups, $R_4$ is selected from the class consisting of alkyl, aralkyl, alkoxyalkyl, dialkoxyalkyl, dialkylaminoalkyl and hydroxyalkyl, and $R_3$ and $R_4$ together form a piperazino ring, $R_3$ and $R_4$ together containing a maximum of ten carbon atoms.

The new derivatives are useful for their pharmacological activities, in particular for their hypotensive effects. They also have muscle relaxant, hypnotic and anticonvulsant activities. In hypotensive activity they are quite potent and show activities at small fractions of the toxic doses which lie in the neighborhood of 100 mg./kg. Doses in the range of 0.5 to 4 mg./kg. produce falls in systolic blood pressure of dogs of from 5 to 45 mm. of mercury, lasting up to 1.5 hours. These effects appear to be produced or at any rate accompanied by peripheral vasodilation. Coronary vasodilation is also a prominent feature of their effects. A number of applications of these findings will be apparent to those versed in the art.

The new substances are formed by the reaction of a 4-chloropyrrolo(2,3-d)pyrimidine with an appropriate amine to give the 4-amino derivative:

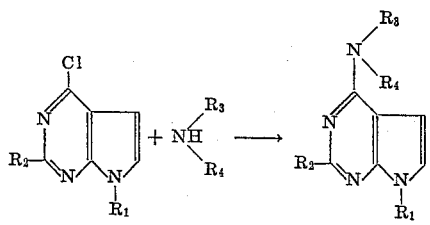

wherein $R_1$, $R_2$, $R_3$ and $R_4$ have the values assigned above. The 4-chloro derivatives are described in U.S. application 602,912 and two additional intermediates 7-methyl-, and 2-methyl-4-chloropyrrolo(2,3-d)pyrimidine are described herein. The 4-chloropyrrolo(2,3-d)pyrimidines are the subject of a divisional application of these applicants.

The compounds having $R_2$ as a hydrogen atom may also be prepared by catalytic dethiolation of the corresponding mercapto compounds of the formula:

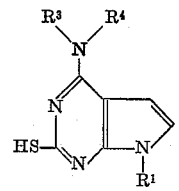

The compounds having $R_1$ as a hydrogen atom may also be prepared from the corresponding 5-(2,2-dialkoxyethyl)-6-aminopyrimidines

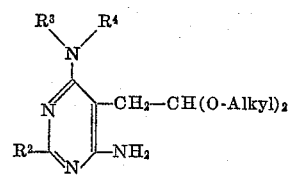

by closure of the pyrrole ring with elimination of two molecules of alkanol.

The following examples illustrate the methods used in the preparation of the new substances.

EXAMPLE 1

4-n-Propylaminopyrrolo(2,3-d)Pyrimidine

To 1.3 grams of 4-chloropyrrolo(2,3-d)pyrimidine (0.0085 mole) in 30 ml. of absolute ethanol containing one drop of concentrated hydrochloric acid was added 2.5 ml. of n-propylamine (0.02 mole). The solution was heated in a metal bomb at 125° C. for 7 hours. The bomb was cooled and its contents were evaporated to dryness on the steam bath. The residual thick oil was triturated with 5 cc. of 2.5% sodium hydroxide and allowed to stand at room temperature until crystallization occurred. Thus, 1.2 grams of crude product was obtained by filtration. This was recrystallized from aqueous ethanol (30%) with added Darco. The compound melted at 162° C.

EXAMPLE 2

2-Methyl-4-n-Amylaminopyrrolo(2,3-d)Pyrimidine

A solution of ethyl α(2,2-diethoxyethyl)cyanoacetate (11.4 g.) in 25 ml. of ethanol was mixed with a solution of acetamidine (from 4.3 g. of acetamidine hydrochloride and 1.15 g. sodium metal in 25 ml. ethanol) and the resultant solution was heated at reflux temperature for 6 hours. The 4-amino-5-diethoxyethyl-6-hydroxy-2-methylpyrimidine was recovered by evaporation of the solvent, addition of aqueous acetic acid to pH 5.0 and filtration.

The product was dissolved in 100 ml. of 95% alcohol, 2 ml. of concentrated sulfuric acid were added and the solution was heated under reflux for 6 hours. The mixture was chilled and the 4-hydroxy-2-methylpyrrolo-(2,3-d)pyrimidine was recovered by filtration.

To 0.9 grams of 2-methyl-4-chloropyrrolo(2,3-d)-pyrimidine (0.0054 mole) in 25 ml. of absolute ethanol containing one drop of concentrated hydrochloric acid was added 2.4 ml. of n-amylamine (0.016 mole). The solution was heated at 140° C. for 7 hours in a metal bomb. The bomb was cooled and its contents evaporated to a thick oil on the steam bath. The oil crystallized upon trituration with 5 cc. of 2.5% sodium hydroxide and yielded 1.1 grams of product after filtering and drying over calcium chloride in a dessicator. The product was recrystallized from 25% aqueous ethanol with added Darco with melting point of 157–159° C.

EXAMPLE 3

*4-n-Amylamino-7-Methylpyrrolo(2,3-d)Pyrimidine*

7-methyl-4-chloropyrrolo(2,3-d)pyrimidine.—Five and eight-tenths grams of 4-chloropyrrolo(2,3-d)pyrimidine (0.033 mole) was dissolved in 40 ml. of NaH-dried dimethylformamide. After cooling to 15° C., 0.95 grams of NaH (0.038 mole) was added. The reaction mixture was allowed to sit at room temperature (under anhydrous conditions) until no further $H_2$ gas was liberated (about 6–7 hours). The clear solution was cooled to 5° C. and 6.2 grams (0.043 mole) of $CH_3I$ was added. The reaction flask was sealed and allowed to stand at room temperature for 24 hours, following which it was heated at 45° C. for 3–4 hours. The suspension was diluted with an equal volume of water, chilled, allowed to stand overnight and filtered to yield 4.1 grams of desired product melting at 130° C. (75% yield).

To 1 g. of 4-chloro-7-methylpyrrolo(2,3-d)pyrimidine in 25 ml. of ethanol (absolute) were added 1 drop of concentrated hydrochloric acid and 1.5 ml. of n-amylamine. The solution was heated in a bomb at 130° C. for 6 hours. After cooling, the contents of the bomb were evaporated to dryness and the solid was triturated with sodium hydroxide. They recrystallized by solution in hot benzene followed by the addition of hexane to a permanent turbidity. On chilling the material crystallized and was recovered by filtration. It melted at 125–127° C.

By the method of Example 1, the following additional pyrrolo(2,3-d)-pyrimidines have been prepared:

| Example: | M.P.° C. |
|---|---|
| 4. 4 - methylaminopyrrolo (2,3 - d) pyrimidine | 236 |
| 5. 4 - dimethylaminopyrrolo(2,3 - d)pyrimidine | 222 |
| 6. 4 - ethylaminopyrrolo(2,3, - d)pyrimidine | 205 |
| 7. 4 - ethylmethylaminopyrrolo(2,3 - d)- pyrimidine | 170 |
| 8. 4 - n - amylaminopyrrolo(2,3 - d)pyrimidine | 129 |
| 9. 4 - iso - propylaminopyrrolo(2,3 - d) pyrimidine | 169–170 |
| 10. 4 - methylpropylaminopyrrolo(2,3-d)- pyrimidine | 148–149 |
| 11. 4 - hydroxyethylaminopyrrolo(2,3 - d)- pyrimidine | 209 |
| 12. 4 - diethoxyethylaminopyrrolo(2,3 - d)- pyrimidine [b] | 124–126 |
| 13. 4 - n - butylaminopyrrolo(2,3 - d)- pyrimidine | 145–146 |
| 14. 4 - isobutylaminopyrrolo(2,3 - d) - pyrimidine | 173–174 |
| 15. 4 - sec - butylaminopyrrolo(2,3 - d)- pyrimidine [c] | 125–126 |
| 16. tert - butylaminopyrrolo(2,3 - d) - pyrimidine [c] | 183 |
| 17. 4 - iso - amylaminopyrrolo(2,3 - d)- pyrimidine [b] | 166–167 |
| 18. 4 - sec - amylaminopyrrolo(2,3 - d)- pyrimidine | 140–141 |
| 19. 4 - n - hexylaminopyrrolo(2,3 - d)- pyrimidine [a] | 150–151 |
| 20. 4 - n - heptylaminopyrrolo(2,3 - d)- pyrimidine [a] | 126–127 |
| 21. 4 - n - octylaminopyrrolo(2,3 - d)- pyrimidine [a] | 118–119 |
| 22. 4 - n - allylaminopyrrolo(2,3 - d)- pyrimidine | 167 |
| 23. 4 - diethylaminoethylaminopyrrolo(2,3-d)pyrimidine | 146–147 |
| 24. 4 - cyclopentylaminopyrrolo(2,3 - d)- pyrimidine | 162–163 |
| 25. 4 - (2 - methoxyethylamino)pyrrolo- (2,3-d)pyrimidine [a] | 167–168 |
| 26. 2 - methyl - 4 - (2 - methoxyethylamino)-pyrrolo(2,3-d)pyrimidine | 144–146 |
| 27. 4 - (3 - methoxypropylamino)pyrrolo- (2,3-d)pyrimidine | 144–145 |
| 28. 4 - dimethylaminopyrrolo(2,3 - d)pyrimidine | 222 |
| 29. 4 - methylethylaminopyrrolo(2,3 - d)- pyrimidine | 170 |
| 30. 4 - methyl - n - propylaminopyrrolo(2,3-d)pyrimidine | 148–149 |
| 31. 4 - methylisopropylaminopyrrolo(2,3-d)pyrimidine | 156–157 |
| 32. 4 - diethylaminopyrrolo(2,3 - d)pyrimidine | 174–175 |
| 33. 4 - di - n - propylaminopyrrolo(2,3-d)- pyrimidine | 118 |
| 34. 4 - piperidinopyrrolo(2,3 - d)-pyrimidine, melting to a clear oil at | 184–185 |

[a] Crystallized from heptane.
[b] Crystallized from benzene-heptane as in Example 3.
[c] Crystallized from benzene.

EXAMPLE 35

*4-n-Nonylaminopyrrolo(2,3-d)Pyrimidine*

4-chloropyrrolo(2,3-d)pyrimidine (1.2 g.) and n-nonylamine (5 g.) were refluxed in water (50 ml.) for 2 hours. The mixture was treated with 5% aqueous sodium hydroxide (4 ml.), chilled for two hours, and filtered. After drying in the dessicator, the solid (2.55 g.) was recrystallized from hot aqueous ethanol yielding 4-n-nonylaminopyrrolo(2,3-d)pyrimidine (2 g.), melting point 122–124° C., as a hemihydrate.

EXAMPLE 36

*2-Methyl-4-Benzylaminopyrrolo(2,3-d)Pyrimidine*

2 - methyl - 4 - chloropyrrolo(2,3 - d)pyrimidine (1.0 g.) and benzylamine (4.0 g.) were refluxed in water (50 ml.) for 3 hours. Ethanol was slowly added, while heating, until complete solution was attained. The solution was chilled overnight and 2-methyl-4-benzylaminopyrrolo(2,3-d)pyrimidine (1.4 g.), melting point 205–207° C., was filtered off.

EXAMPLE 37

*2-Methyl-4-N'-Methylpiperazinopyrrolo(2,3-d)Pyrimidine*

2-methyl-4-chloropyrrolo(2,3-d)pyrimidine (2.0 g.) and N-methylpiperazine (5.0 g.) were refluxed in water (65 ml.) for 2 hours. Then potassium hydroxide (3 g.) was added and when dissolved the clear solution was chilled overnight yielding a primary crop (2 g.) of 2-methyl - 4 - N' - methylpiperazinopyrrolo(2,3 - d)pyrimidine as a dihydrate. A second crop (0.35 g.) was obtained by slowly evaporating off one-half of the mother liquor. Recrystallization from n-heptane yielded a hemihydrate, melting point 191–192° C.

EXAMPLE 38

*4-N'-Ethylpiperazinopyrrolo(2,3-d)Pyrimidine*

4-chloropyrrolo(2,3-d)pyrimidine (1.2 g.) and N-ethylpiperazine (4 g.) were heated in water (50 ml.) at 85–90° C. for 2 hours. Then potassium hydroxide (3.5 g.) was dissolved in the reaction mixture and the solution was chilled overnight. Upon filtration 4-N'-ethylpiperazinopyrrolo(2,3-d)pyrimidine (1.5 g.) was obtained as a dihydrate. Drying for 1.5 hours at 135° C. gave a hemihydrate. The compound changed in crystalline form at 150–160° C. and melted to a clear oil at 175° C.

The following compounds were prepared from the appropriate amine and a 4-chloropyrrolo(2,3-d)pyrimidine by methods similar to those described in Examples 35 to 38.

|   | °C. |
|---|---|
| 39. 4 - n - hexylaminopyrrolo(2,3-d)-pyrimidine [a] | 150–151 |
| 40. 4 - isohexylaminopyrrolo(2,3 - d)pyrimidine | 129–130 |
| 41. 4 - n - heptylaminopyrrolo(2,3 - d)pyrimidine [a] | 135 |
| 42. 4 - n - octylaminopyrrolo(2,3 - d)pyrimidine [a] | 118–119 |
| 43. 2 - phenyl - 4 - n - nonylaminopyrrolo(2,3-d)pyrimidine | 126–138 |
| 44. 4 - n - decylaminopyrrolo(2,3 - d)pyrimidine | 110–111 |
| 45. 4 - cyclohexylaminopyrrolo(2,3 - d)pyrimidine | 149–151 |
| 46. 4 - benzylaminopyrrolo(2,3 - d)pyrimidine | 196 |
| 47. 2 - methyl - 4 - p - methylbenzylaminopyrrolo(2,3-d)pyrimidine | 211 |
| 48. 4 - (2 - phenylethylamino)pyrrolo(2,3-d)pyrimidine | 197–198 |
| The hydrochloride melted at | 231–234 |
| 49. 4 - (2 - dimethylaminoethylamino)pyrrolo(2,3-d)pyrimidine | 164–165 |
| 50. 4 - (2 - diethylaminoethylamino)pyrrolo(2,3-d)pyrimidine | 146–147 |
| 51. 4 - (2 - hydroxyethylamino)pyrrolo(2,3-d)pyrimidine | 209 |
| 52. 4 - (2,2 - diethoxyethylamino)pyrrolo(2,3-d)pyrimidine [b] | 124–126 |
| 53. 2 - methyl - 4 - (2,2 - diethoxyethylamino)pyrrolo(2,3-d)pyrimidine | 129–130 |
| 54. 4 - (3,3 - diethoxypropylamino)pyrrolo-(2,3-d)pyrimidine | 120–121 |
| 55. 4 - carboxymethylaminopyrrolo(2,3-d)pyrimidine, which turned pink at 230° C., and decomposed completely at 265–270° C. with evolution of gas. |  |
| 56. 4 - furfurylaminopyrrolo(2,3 - d)pyrimidine | 154 |
| 57. 4 - methyl(2,2 - diethoxyethyl)aminopyrrolo(2,3-d)pyrimidine | 127–129 |
| 58. 2 - methyl - 4 - methyl(2,2 - diethoxyethyl)aminopyrrolo(2,3-d)pyrimidine | 155 |
| 59. 4 - methyl(3.3 - diethoxypropyl)aminopyrrolo(2,3-d)pyrimidine | 87–89 |
| 60. 4 - ethylcarboxymethylaminopyrrolo(2,3-d)pyrimidine | 204 |
| 61. 4 - morpholinopyrrolo(2,3 - d)pyrimidine | 215 |

[a] Crystallized from heptane.
[b] Crystallized from benzene-heptane as in Example 3.

The following compounds weer prepared from the appropriate amine and a 4-chloropyrrolo(2,3-d)pyrimidine by methods similar to those described in Examples 1 to 3.

|   | °C. |
|---|---|
| 62. 2 - methyl - 4 - ethylaminopyrrolo(2,3-d)pyrimidine | 189–190 |
| 63. 4 - ethylamino - 7 - methylpyrrolo(2,3-d)pyrimidine | 159 |
| 64. 4 - methyl - n - amylaminopyrrolo(2,3,d)pyrimidine | 133–135 |

The following compounds were prepared from the appropriate amine and a 4-chloropyrrolo(2,3-d)pyrimidine by methods similar to those described in examples 35 to 38.

|   | °C. |
|---|---|
| 65. 2 - methyl 4 - n - nonylaminopyrrolo(2,3-d)pyrimidine | 110–113 |
| 66. 2 - methyl - 4 - (2 - phenylethylamino)pyrrolo(2,3-d)pyrimidine | 208–209 |
| 67. 4 - N' - methylpiperazinopyrrolo(2,3-d)pyrimidine | 142 |

The following compounds were prepared from ammonia and the appropriate 4-chloropyrrolo(2,3-d)pyrimidine by methods similar to that described in Example 64.

|   | °C. |
|---|---|
| 68. 2 - methyl - 4 - aminopyrrolo(2,3 - d)pyrimidine | 290–295 |

EXAMPLE 69

A solution of 4-chloropyrrolo(2,3-d)pyrimidine (1.7 g.) and pyrrolidine (3 g.) in 95% ethanol (35 ml.) was heated in a bomb at 130° C. for 6.5 hours. The solvent was evaporated and the oily residue was dissolved in water (60 ml.) at pH 2.0 by the addition of a 1:1 dilution of hydrochloric acid. A small amount of black tar was filtered off and the filtrate was adjusted to pH 10.0 to give 4-pyrrolidinopyrrolo(2,3-d)pyrimidine (1.7 g.) melting point 263–265° C., as a white amorphous precipitate.

|   | °C. |
|---|---|
| 70. 2 - methyl - 4 - (3' - methoxy)propylaminopyrrolo(2,3-d)pyrimidine | 188–189 |
| 71. 2 - methyl - 4 - (2' - pyridylmethyl)aminopyrrolo(2,3-d)pyrimidine | 215–216 |
| 72. 2 - methyl - 4 - (3',4',5'-trimethoxybenzyl)aminopyrrolo(2,3-d)pyrimidine | 216–217 |
| 73. 2 - methyl - 4 - (3' - methylbenzyl)aminopyrrolo(2,3 - d)pyrimidine base | 184–185 |
| Hydrochloride salt | 230–236 |
| 74. 4 - (2' - thenylamino) - pyrrolo(2,3 - d)pyrimidine | 272–276 |
| 75. 4 - (o - chlorobenzylamino)pyrrolo(2,3-d)pyrimidine | 220–222 |
| 76. 4 - p - methylbenzylaminopyrrolo(2,3-d)pyrimidine | 203–205 |
| 77. 4 - N - methyl - N - benzylaminopyrrolo(2,3-d)pyrimidine | 228–230 |
| 78. 4 - (p - chorobenzylamino)pyrrolo(2,3-d)pyrimidine | 205–206 |
| 79. 4 - (p - methoxybenzylamino)pyrrolo(2,3-d)pyrimidine | 236–239 |
| 80. 4 - methyl - n - nonylaminopyrrolo(2,3-d)pyrimidine | 105–106 |
| 81. 4 - m - methylbenzylaminopyrrolo(2,3-d)pyrimidine | 178–180 |
| 82. 4 - o - methylbenzylaminopyrrolo(2,3 -d)pyrimidine | 259–261 |
| 83. 4 - (2' - pyridyl)methylaminopyrrolo(2,3-d)pyrimidine | 184–186 |
| 84. 4 - diethanolaminopyrrolo(2,3 - d)-pyrimidine | 196–198 |
| 85. 2 - n - propyl - 4 - n - nonylaminopyrrolo(2,3-d)pyrimidine | 94–96 |
| 86. 7 - methyl 4 - n - nonylaminopyrrolo(2,3-d)pyrimidine hydrochloride | 129–130 |
| 87. 2,7 - dimethyl - 4 - benzylaminopyrrolo(2,3-d)pyrimidine | 147–148 |
| 88. 4 - (4' - methylpiperazino) - 7 - methylpyrrolo(2,3-d)pyrimidine hydrochloride, effervescence at 190–210° C.; residue melts at 233–238° C. |  |
| 89. 2 - n - propyl - 4 - benzylaminopyrrolo(2,3-d)pyrimidine | 161–162 |
| 90. 2 - n - propyl - 4 - (4' - ethylpiperazino)pyrrolo(2,3-d)pyrimidine | 121 |
| 91. 4 - (4' - isopropyl)piperazinopyrrolo(2,3-d)pyrimidine | 178–179 |
| 92. 4 - (4' - n - propyl)piperazinopyrrolo(2,3-d)pyrimidine | 172–174 |
| 93. 4 - 4' - carbethoxy)piperazinopyrrolo(2,3-d)pyrimidine | 204-205 |
| 94. 4 - (4' - β - hydroxyethyl)piperazinopyrrolo(2,3-d)pyrimidine | 176–177 |
| 95. 4 - (4' - n - butyl)piperazinopyrrolo(2,3-d)pyrimidine | 171–172 |

| | °C. |
|---|---|
| 96. 4 - (3',4',5' - trimethyl)piperazinopyrrolo-(2,3-d)pyrimidine | 206–207 |
| 97. 4 - (4' - ethyl)piperazinopyrrolo(2,3-d)-pyrimidine methiodide | 225–230 |
| 98. 4 - n - octyloxypyrrolo(2,3-d)pyrimidine | 107–109 |
| 99. 4 - n - octylmercaptopyrrolo(2,3-d)-pyrimidine | 111–112 |
| 100. 2 - methyl - 4 - (β - dimethylaminoethoxypyrrolo(2,3-d)pyrimidine methiodide | 201–203 |
| 101. 2 - methyl - 4 - (p - methoxybenzylamino)-pyrrolo(2,3-d)pyrimidine | 189–191 |
| 102. 2 - methyl - 4 - (3' - isopropoxy) - n - propylaminopyrrolo(2,3-d)pyrimidine | 139–140 |
| 103. 2 - methyl - 4 - methyl - n - propylaminopyrrolo(2,3-d)pyrimidine | 123–125 |
| 104. 2 - methylpyrrolo(2,3 - d)pyrimidine | 179–180 |
| 105. 2 -methyl - 4 - (4' - n - propylpiperazinopyrrolo(2,3-d)pyrimidine | 194–196 |
| 106. 2 - methyl - 4 - (β - phenyl)ethylamino-pyrrolo(2,3-d)pyrimidine base | 208–209 |
| Hydrochloride salt | 112–116 |
| 107. 2 - methyl - 4 - (p - chlorobenzylamino)-pyrrolo(2,3-d)pyrimidine | 234–235 |
| 108. 2 - methyl - 4 - (N - methylbenzylamino)-pyrrolo(2,3-d)pyrimidine | 218–219 |
| 109. 2 - methyl - 4 - (2' - thenylamino)pyrrolo(2,3-d)pyrimidine | 214–215 |
| 110. 2 - methyl - 4 - (o - chlorobenzylamino)-pyrrolo(2,3-d)pyrimidine | 219–222 |
| 111. 2 - methyl - 4 - (α - furfurylamino)-pyrrolo(2,3-d)pyrimidine (change in crystalline form above 160° C.) | 195–197 |

What we claim is:

1. A compound of the formula:

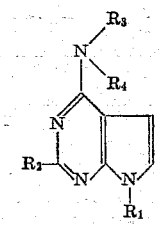

wherein $R_1$ and $R_2$ are selected from the class consisting of hydrogen and lower alkyl groups, $R_3$ is selected from the class consisting of hydrogen and lower alkyl groups, $R_4$ is selected from the class consisting of alkyl, phenylalkyl, alkoxyalkyl, dialkoxyalkyl, dialkylaminoalkyl and hydroxyalkyl, and $R_3$ and $R_4$ together form a piperazino ring, $R_3$ and $R_4$ together containing a maximum of ten carbon atoms.

2. 4-(methyl-n-propylamino)pyrrolo(2,3-d)pyrimidine.
3. 2-methyl-4-benzylaminopyrrolo(2,3-d)pyrimidine.
4. 4-n-nonylaminopyrrolo(2,3-d)pyrimidine.
5. 2-methyl-4-(4'-methylpiperazino)pyrrolo(2,3-d)pyrimidine.
6. 2-methyl-4-(2'-methoxyethyl)aminopyrrolo(2,3-d)-pyrimidine.
7. 4-diethoxyethylaminopyrrolo(2,3-d)pyrimidine.
8. 4-ethylaminopyrrolo(2,3-d)pyrimidine.
9. 4-n-propylaminopyrrolo(2,3-d)pyrimidine.
10. 4-methoxymethylaminopyrrolo(2,3-d)pyrimidine.
11. 4-tert-butylaminopyrrolo(2,3-d)pyrimidine.

No references cited.